United States Patent [19]

Emery

[11] Patent Number: 4,458,915
[45] Date of Patent: Jul. 10, 1984

[54] MOTOR VEHICLE WHEEL SUSPENSION

[75] Inventor: Peter K. Emery, Hutton, England

[73] Assignee: Ford Motor Company, Dearborn, Mich. ; a part interest

[21] Appl. No.: 403,736

[22] PCT Filed: Nov. 19, 1981

[86] PCT No.: PCT/GB81/00249
§ 371 Date: Jul. 19, 1982
§ 102(e) Date: Jul. 19, 1982

[87] PCT Pub. No.: WO82/01688
PCT Pub. Date: May 27, 1982

[30] Foreign Application Priority Data

Nov. 19, 1980 [GB] United Kingdom ............... 8037015
May 5, 1981 [GB] United Kingdom ............... 8113724

[51] Int. Cl.³ .................................... B60G 7/02
[52] U.S. Cl. ................................. 280/668; 280/675
[58] Field of Search .......... 280/691, 696, 668, 673, 280/674, 675, 96.1, 660, 661

[56] References Cited

U.S. PATENT DOCUMENTS 3,178,202 4/1965 Kozicki ........................... 280/696
3,942,815 3/1976 Schwenk et al. ............... 280/675
4,273,356 6/1981 Sakata et al. ................... 280/675

Primary Examiner—Joseph F. Peters, Jr.
Assistant Examiner—Ross Weaver
Attorney, Agent, or Firm—Jerome R. Drouillard; Roger L. May

[57] ABSTRACT

A motor vehicle wheel suspension has a compliance device 23 which permits limited longitudinal displacement of the wheel relative to the vehicle so that the wheel can be displaced forwardly and rearwardly by rotating out of balance forces when the wheel rotates at a critical wobble speed- and the geometry of the suspension pivot points 3,9,18 and 15 is arranged to cause the wheel to toe in for forward longitudinal displacement of the wheel and to toe out for rearward longitudinal displacement of the wheel, the amount of toe in or toe out for a given longitudinal displacement being matched with the toe in and toe out arising from wheel oscillations at the critical wobble speed to reduce the effect of the out of balance forces on the unsprung part of the vehicle.

12 Claims, 7 Drawing Figures

MOTOR VEHICLE WHEEL SUSPENSION

DESCRIPTION

This invention relates to motor vehicle wheel suspensions, and is of particular utility in independent steerable front wheel suspensions.

A major problem with all front wheel suspensions is known in the industry as "shimmy". This is caused inter alia by the front wheels or a front wheel being out of balance. In the remainder of this specification reference will be made to one wheel, it being understood that similar considerations apply to the corresponding road wheel at the other side of the vehicle. Rotation of an out of balance wheel creates an out of balance force directed radially of the wheel and rotating with the wheel. At certain critical vehicle speeds, hereinafter called "critical wobble speed", typically about 25 m.p.h., about 55 m.p.h., and about 85 m.p.h., a resonant condition occurs and the wheel oscillates in a certain mode characteristic of the suspension. The base frequency of this oscillation is of the order of 10 Hz with harmonics at approximately 5 and 18 Hz. The lower the frequency the greater the amplitude of the oscillation; and the higher the frequency the lower the amplitude. In most known front suspensions, these oscillations are transmitted through a steering linkage and steering mechanism to the steering wheel, and this causes discomfort to the driver. In order to avoid this problem, it is known to carefully balance the wheels but this solution requires additional operation during vehicle manufacture and rebalancing of the wheels in service as the tires wear or are replaced or the balancing weights are lost.

It is therefore an object of the present invention to provide an improved vehicle wheel suspension which will be tolerant of wheel imbalance so that wheel balancing is either avoided completely or is necessary less frequently or is required to less accurate standards.

We have realised and confirmed by experiment and calculation that the wheel oscillations caused by the rotating out of balance forces are of limited amplitude even if the wheel is substantially free to move longitudinally of the vehicle. As the wheel is displaced forwardly by the unbalance force it tends to turn inwardly (toe in) and as the wheel is displaced rearwardly it tends to turn outwardly (toe out), because the unbalance forces when acting forwardly or rearwardly have a turning movement about the king pin axis of the wheel. The magnitude of toe in and toe out movement caused by the out of balance forces is greater in suspensions with a large offset from the king pin axis.

The present invention utilises a novel compliance device in combination with appropriate modification of the geometry of the suspension to reduce, not the oscillations, but the transmission of them to the steering wheel or in the case of a rear suspension, to the body.

It is well known to fit a "compliance device" in the suspension of a motor vehicle. This device provides a resilient connection of the wheel to the vehicle and is intended to reduce noise, vibration and harshness transmitted to the sprung part of the vehicle from the road surface.

The novel compliance device of the invention permits limited forward and rearward displacement of the wheel spindle relative to the vehicle. Its longitudinal resistance for such limited forward and rearward displacement must be proportionately less than that required to overcome the friction in the steering gear linkage.

Hitherto the steering link and suspension arm have in many vehicles approximately constituted a parallelogram (that is the pivot points of the steering link and suspension arm and their respective connections to the wheel are at the four corners of the parallelogram) so that as the wheel is displaced longitudinally as permitted by the compliance device the road wheel is not turned. In some vehicles the steering link and suspension arm have not constituted a parallelogram. This has not been to achieve any special result but has been dictated by package requirements.

In the case of rear wheel suspensions, the oscillations of the rear wheels due to the wheels being out of balance are resisted by the rear suspension. This results in body shake. The invention may be used in a rear wheel suspension as well as in a front wheel suspension.

A motor vehicle suspension has the following features: a compliance device permits limited longitudinal displacement of the wheel relative to the vehicle so that the wheel can be displaced forwardly and rearwardly by rotating out of balance forces when the wheel rotates at a critical wobble speed; and the geometry of the suspension is such that it causes the wheel to toe in for forward longitudinal displacement of the wheel and to toe out for rearward longitudinal displacement of the wheel by substantially the same amount for a given longitudinal displacement as the toe in and toe out movements which would be caused for the same longitudinal displacement at said critical wobble speed by said out of balance forces in the absence of any restraint of angular movements of the wheel about a substantially vertical axis, whereby the effect of the out of balance forces on the unsprung part of the vehicle is reduced.

In the case of steerable independent front wheel suspension, the effect is that the transmission of wheel oscillations to the steering wheel is reduced or even eliminated; and in the case of rear suspensions the body shake caused by out of balance forces is reduced.

Somewhat inaccurately but possibly more clearly the invention may be summarised as follows: an out of balance force on the road wheel causes it to oscillate at a high frequency about a vertical axis (the king pin); the out of balance force exerts a forward or rearward longitudinal force on the suspension linkage which causes the wheel to move as permitted by the compliance device forwardly or rearwardly relative to the sprung part of the vehicle; and the idiosyncratic geometry of the suspension arm and the steering link is such that when this oscillation takes place the steering link is displaced substantially at right angles to its axis so that axial displacement of the steering link which would otherwise occur and cause movement of the steering wheel is reduced or eliminated.

"Shimmy" occurs at different frequencies. The energy of the oscillating wheel and the longitudinal forces exerted on the wheel by the out of balance forces is greater at higher critical wobble speeds. The amplitude on the other hand is lower at higher critical wobble speeds. Therefore if the longitudinal movement permitted by the compliance device was independent of the frequency of oscillation the compliance device would provide more movement than was necessary at the higher frequencies. This is undesirable because the vehicle speed is so high at the higher frequencies that good control of suspension movements is required for handling purposes.

In order to overcome this problem the compliance device is formed with resilient material which becomes harder and permits less displacement as the frequency of the road wheel oscillations increases. In effect therefore a degree of progressive change in the compliance device is provided to match it approximately to the amplitude of the "shimmy" oscillations.

The invention is particularly suitable for use with Macpherson front suspensions, in which the compliance device is used to connect the suspension arm to a stabiliser (or anti-roll) bar or tie rod. The invention can however be incorporated in other forms of suspensions for example the double wishbone or short long arm suspension. The term "suspension arm" includes the two links of the double wishbone or short/long arm suspensions.

The invention is hereinafter particularly described with reference to the accompanying drawings, in which.

Figure 1:
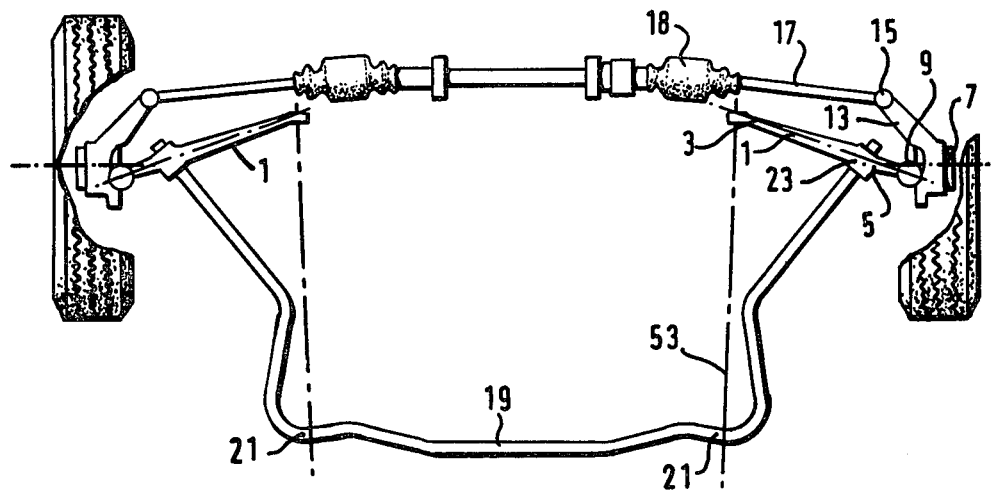
FIG. 1 is a plan view of the Macpherson suspension incorporating the invention.
Figure 2:
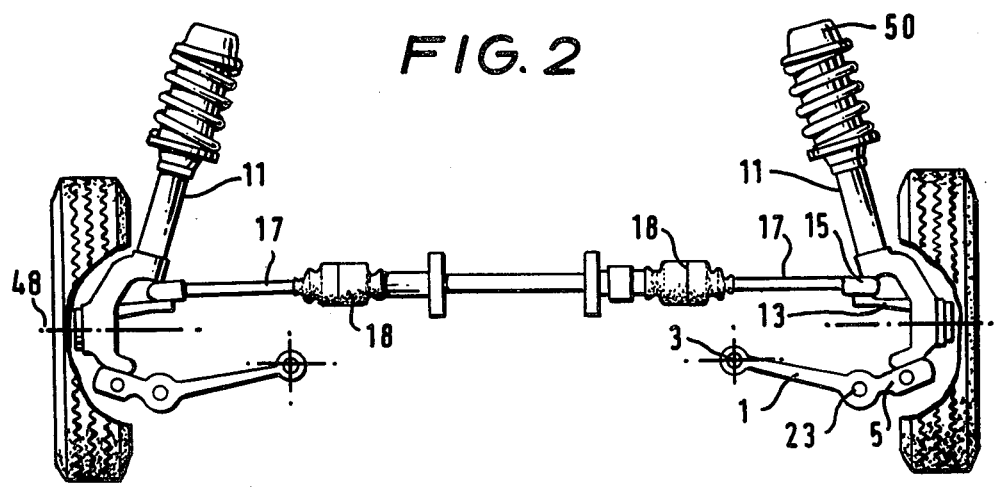
FIG. 2 is a front elevation of the suspension.

The independent front suspension shown in FIG. 1 is of the type known as a Machpherson suspension. It comprises at each side of the vehicle a suspension arm 1 pivotally mounted in the sprung part of the vehicle about a generally longitudinal axis 53 by a pivot bush 3 which permits limited forward and rearward movement of the outer end 5 of the suspension arm 1.

A wheel spindle 7 is connected by a suspension ball joint 9 to a king pin carried by the suspension arm 1 and is fixed to the lower end of a conventional suspension strut 11. The upper end of the strut 11 is fixed to the sprung part of the vehicle by an upper mount 50 in the conventional way, the casing of the strut being rotatable relatively to the piston of the strut so that the wheel spindle can rotate about a king pin axis defined by the upper mount 50 and the suspension ball joint 9. The wheel spindle 7 has a conventional stub axle 48 on which a road wheel is rotatably mounted.

A steering arm 13 extends rearwardly from the wheel spindle 7 and is connected by a steering ball joint 15 to a steering link 17. The latter in turn is connected by a ball joint 18 and a conventional rack and pinion steering mechanism to the steering wheel (not shown).

As the steering wheel is turned, the steering link 17 is moved along its axis. This turns the wheel spindle 7 about the king pin axis and so turns the road wheel.

Movement of the suspension arm 1 about the generally vertical axis is controlled by a U-shaped stabiliser (or anti-roll) bar 19. The base of the U is fixed in the sprung part of the vehicle at two spaced apart positions 21 while each end of the bar 19 is connected to the suspension arm 1 by a compliance device 23 shown in FIG. 5. The compliance device includes resilient bushes 35 arranged to permit the outer end of the suspension arm 1 a limited amount of substantially free forward and rearward movement, as described in more detail below.

Figure 3:
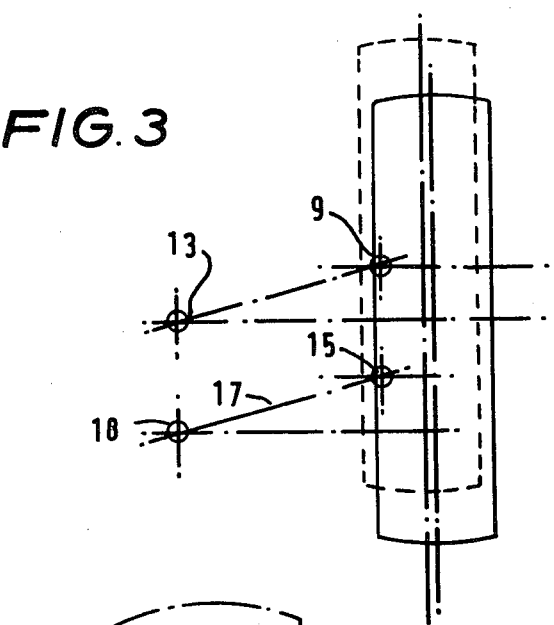
FIG. 3 is a diagramatic plan view of the geometry of a conventional front suspension having a compliance device for suppression of noise, vibration and harshness.

Hitherto it has been conventional to arrange the centres of the steering ball joints 18 and 15, suspension ball joint 9 and pivot bush 3 so that they constitute a parallelogram. This is shown in FIG. 3. As the outer end of the suspension arm 1 moves forwardly or rearwardly as permitted by the elasticity of the compliance device 23, the toe in or toe out of the wheel is not affected. If the wheel is out of balance, the wheel will oscillate about the king pin axis at one or more critical wobble speeds of the vehicle. The oscillation occurs at a base frequency of 10 Hz with harmonics at approximately 5 and 18 Hz in an average wheel assembly corresponding to vehicle speeds of about 25, 55 and 85 m.p.h. At lower frequencies the oscillation amplitude is greater than at the higher frequency. But the kinetic energy of the oscillation varies with the square of the velocity of the oscillations and hence is higher at higher frequencies.

These oscillations are known as "shimmy" or "nibble" and if they are transmitted through the steering arm 13, steering link 17 and rack and pinion steering gear mechanism to the steering wheel they cause oscillation of the steering wheel.

Figure 4:
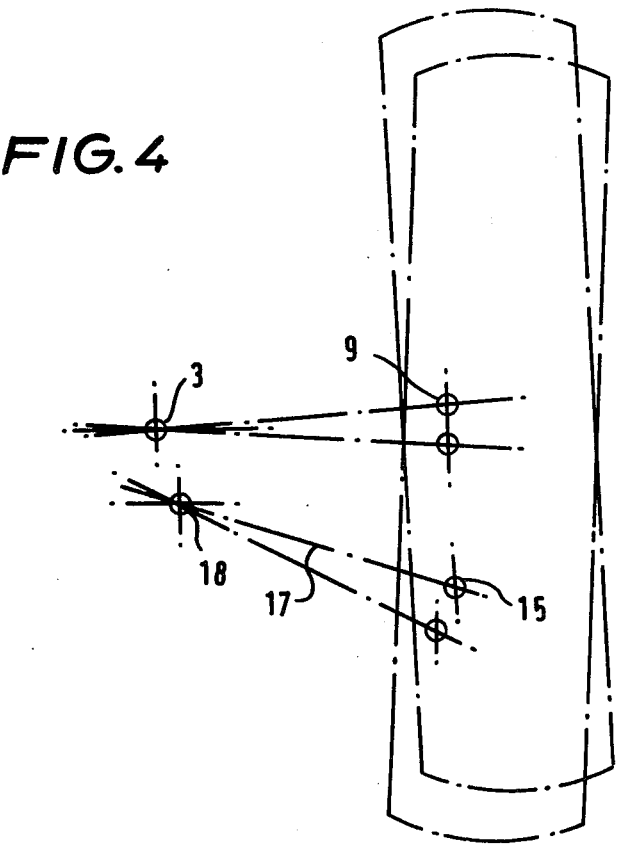
FIG. 4 is a diagramatic plan view of the modified geometry of the front suspension incorporating this invention.

According to this invention the geometry of the steering/suspension is altered as shown in FIG. 4. The pivot points 3, 9, 18 and 15 no longer constitute a parallelogram. This may be achieved in existing vehicles by relocating the pivot bush 3 at the inner end of the suspension arm 1 closer to the inner steering ball joint 18, or by relocating the steering rack closer to the pivot bush 3. In some known vehicles the amount of relocation required may be of the order of 10 mm to 30 mm. Therefore when the wheel moves forwardly or rearwardly as permitted by the compliance device 23, the geometry of the points 3, 9, 18 and 15 is such that the suspension imparts a toe in to the road wheel with forward displacement of the wheel relative to the vehicle and toe out with rearward displacement.

When the wheel is rotating at a critical wobble speed it oscillates about a generally vertical axis and there is a longitudinal force exerted on the wheel and hence on the suspension arm 1. As the wheel moves to the toe out position there is a rearward force on the suspension arm; and as the wheel moves to a toe in position there is a forward force on the suspension arm.

The geometry of the suspension is such that it causes the wheel to toe in for forward longitudinal displacement of the wheel and to toe out for rearward longitudinal displacement of the wheel by substantially the same amount for a given longitudinal displacement as the toe in and toe out movements which would be caused for the same longitudinal displacement at said critical wobble speed by said out of balance forces in the absence of any restraint of angular movements of the wheel about a substantially vertical axis, whereby the effect of the out of balance forces on the unsprung part of the vehicle is reduced.

At a critical wobble speed, the out of balance forces are such as to cause the suspension arm 1 to move as permitted by the compliance device 23 and pivotal connection 3. This movement causes the suspension steering geometry to move the ball joint 15 at the outer end of the steering link 17 to the position the steering link is being moved by the oscillations of the wheel.

Consequently, there is no movement of the steering wheel. It is of course difficult to establish the correct location of the pivot points 3 and 18 and to exactly match the path of steering ball joint 15 with the wheel oscillations. This however is the objective and it is best achieved by calculations to establish theoretically correct positions for the pivot points followed by fine tuning of the suspension by testing the effect of a number of positions close to those established by theory.

Figure 5:
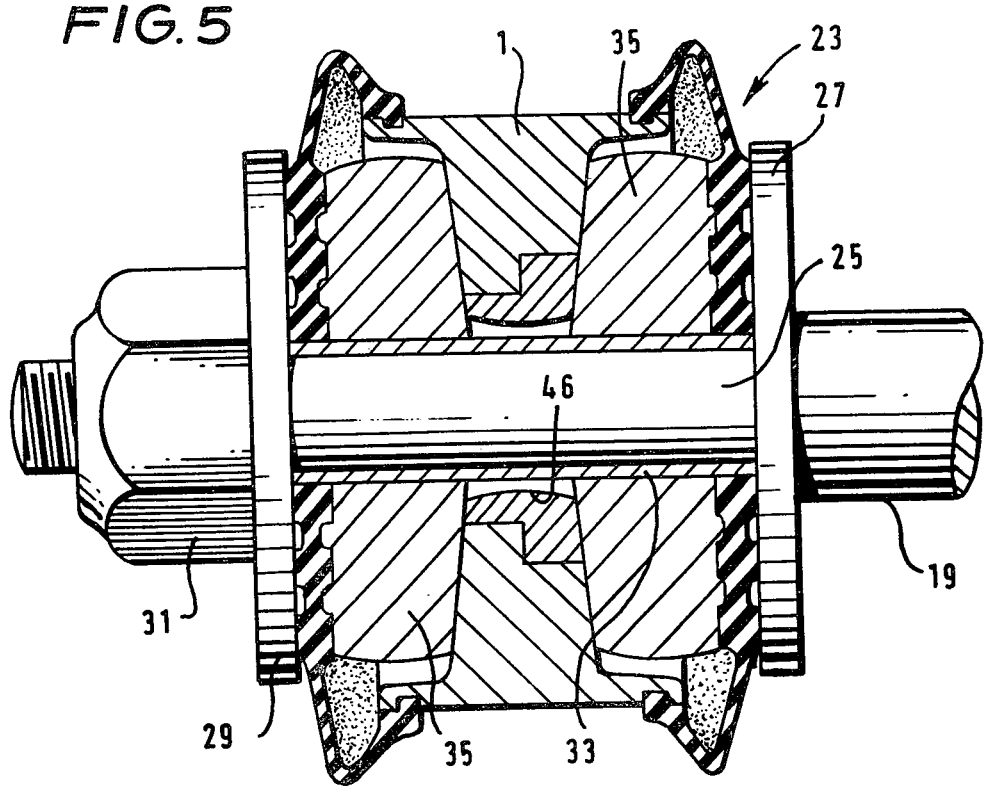
FIG. 5 is a section through part of the suspension of this invention.

The novel compliance device which is an important feature of the suspension is shown in FIG. 5. The ends of the stabiliser bar 19 extend through an aperture in the suspension arm 1. The ends of the bar have a reduced diameter portion 25, with a threaded end portion. A retainer 27 engages the shoulder between the large and narrow diameter portions, and the component parts are held between the retainer 27 and the retainer 29 by a nut 31. A metal sleeve 33 is mounted on the part 25. A bearing 46 fits an aperture in the arm 1 and transfers the loads from the arm 1 to the stabiliser bar 19. Located either side of the bearing 46 are two bushes 35 made of micro-cellular polyurethane. These bushes provide the resilience in the compliance device to permit the arm 1 to move relative to the end of the stabiliser bar 19 in the longitudinal direction of the vehicle. As a longitudinal force is exerted on the arm 1 by a wheel in the state of "shimmy", it moves relative to the bar 19 against the bushes 35.

Figure 6:
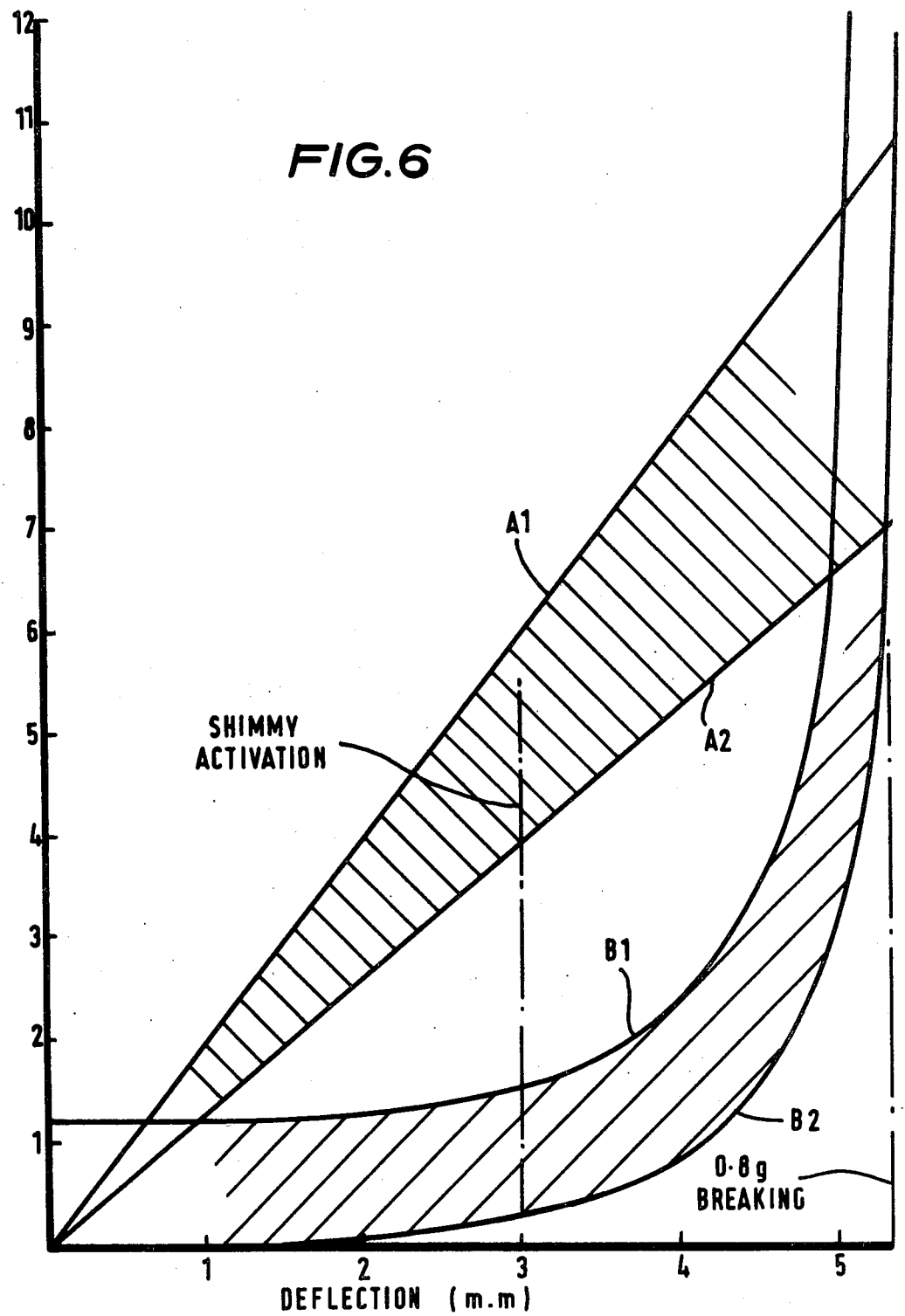
FIG. 6 is a graph of the characteristics of a conventional compliance device and a compliance device according to this invention.

In FIG. 6, the y axis represents the load in kilo-newtons on a wheel in the longitudinal direction of the vehicle, while the x axis represents deflection of the compliance device in mm. Lines A1 and A2 represent the upper and lower limits for a typical load/deflection characteristic of a conventional compliance device; while curves B1 and B2 represent the upper and lower limits for the deflection characteristic for a car of the size of a Ford Cortina of the novel compliance device according to this invention when the wheels are not oscillating due to shimmy.

The conventional compliance device has a linear load/deflection characteristic. As can be seen in FIG. 6, the compliance device of the invention offers little resistance to the initial 3 mm of deflection in either direction. This is achieved by avoiding friction in the device and having very little preload on the bushes 35. The compliance device resiliently opposes deflection greater than 3 mm to control braking loads and road shocks. Line 47 in FIG. 6 corresponds to the deflection produced by 0.8 g braking. Line 49 indicates the deflection which occurs at a critical wobble speed due to wheel oscillations. The resistance of the compliance device to such deflections must be less than the frictional resistance in the steering linkage to steering movements.

An important feature of this invention is that the deflection characteristic of the compliance device 23 is not the same for all frequencies of oscillation. A characteristic of micro-cellular polyurethane is that the elasticity varies inversely with the frequency of the change of load (such as occurs in a shimmy condition). Thus the resistance of the compliance device to deflection is greater at higher frequency and hence the free movement allowed by the compliance device is less at a high critical wobble speed than at a low critical wobble speed. When the high frequency lower amplitude oscillations occur the elasticity is less than when the lower frequency high amplitude oscillations occur.

Figure 7:
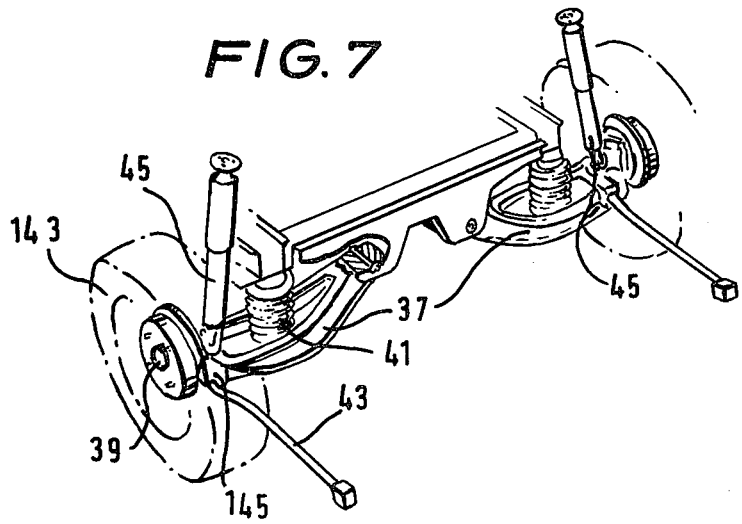
FIG. 7 is a perspective view of a rear suspension which includes this invention.

FIG. 7 shows an independent rear suspension incorporating the invention. It comprises a suspension arm 37 in the form of a wishbone, a stub axle 39 pivotally connected to the arm 37 for movement about a longitudinal axis of the vehicle, a coil spring 41 and a tie bar 43. The suspension arm 37 is pivotally connected to the sprung part of the vehicle about a generally longitudinal axis. The pivotal connection of the arm 37 to the vehicle is such that the outer end of the arm can move forwardly or rearwardly through a small distance. The camber of the wheel is controlled by a Macpherson strut 45 connected to the stub axle 39 and the body. The tie bar 43 is pivotally connected to the sprung part of the vehicle for movement about a transverse axis, and is connected to the suspension arm 37 by a compliance device 145 which is similar to that described above with reference to FIGS. 5 and 6. When the wheel oscillates at a critical wobble speed, the rotating unbalance forces cause the wheel to move forwardly or rearwardly and the arm 37 to pivot about the vertical axis; the geometry is such that this movement imparts toe in or toe out to the wheel in the same direction as the toe in or toe out produced by the wheel oscillation.

I claim:
1. A motor vehicle wheel suspension in which:
   a. a compliance device permits limited longitudinal displacement of the wheel relative to the vehicle so that the wheel can be displaced forwardly and rearwardly by rotating out of balance forces when the wheel rotates at a critical wobble speed; and
   b. the geometry of the suspension is such that it causes the wheel to toe in for forward longitudinal displacement of the wheel and to toe out for rearward longitudinal displacement of the wheel by substantially the same amount for a given longitudinal displacement as the toe in and toe out movements which would be caused for the same longitudinal displacement at said critical wobble speed by said out of balance forces in the absence of any restraint of angular movements of the wheel about a substantially vertical axis, whereby the effect of the out of balance forces on the unsprung part of the vehicle is reduced.

2. A motor vehicle steerable independent front wheel suspension in which:
   a. a road wheel is rotatable about a generally vertical axis on a suspension link to steer the vehicle;
   b. the suspension arm is pivotally mounted in the sprung part of the vehicle about a generally longitudinal horizontal axis to permit suspension movement and about a generally vertical axis to permit limited forward and rearward movement of the outer end of the arm;
   c. the steering wheel of the vehicle is connected to the road wheel by a steering link;
   d. the suspension includes a compliance device which permits limited movement of the suspension arm about the generally vertical axis so that the outer end of the arm can be moved forwardly and rearwardly through a small distance by rotating out of balance forces when the wheel rotates at a critical wobble speed; and
   e. the geometry of the suspension arm and the steering link is such that it causes the wheel to toe in for forward longitudinal displacement of the wheel and to toe out for rearward longitudinal displacement of the wheel by substantially the same amount for a given longitudinal displacement as the toe in and toe out movements which would be caused for the same longitudinal displacement at said critical wobble speed by said out of balance forces in the absence of any restraint of angular movements of the wheel about a substantially vertical axis, whereby the effect of the out of balance forces on the unsprung part of the vehicle is reduced.

3. A suspension as claimed in claim 1 or claim 2 in which the limited longitudinal displacement permitted by the compliance device is approximately equal to the amplitude in the longitudinal direction of the oscillations of the wheel at a critical wobble speed.

4. A suspension as claimed in claims 1 or 2 in which the resistance of the compliance device to said limited longitudinal displacement is less than the resistance of the steering linkage to steering movements.

5. A suspension as claimed in claims 1 or 2 in which the compliance device resiliently controls longitudinal displacements of greater amplitude than said limited longitudinal displacement.

6. A suspension according to claims 1 or 2 in which the limited longitudinal displacement permitted by the compliance device is less for displacements at a first critical wobble speed than at a second lower critical wobble speed.

7. A suspension according to claim 6 in which the compliance device includes bushes of a microcellular material such as micro-cellular polyurethane arranged to limit said longitudinal displacement.

8. A suspension according to claims 1 or 2 which is a Macpherson suspension and in which the compliance device includes a resilient bushing connecting a stabilizer bar to the suspension arm.

9. A suspension according to claim 8 in which the compliance device includes a bearing adapted to transfer the radial force acting on the stabilizer bar to the suspension arm.

10. A suspension according to claim 1 which is a rear suspension having a suspension arm pivotally connected to the sprung part of the vehicle about a longitudinal axis and about a vertical axis so that the outer end of the arm can move forwardly or rearwardly for said limited displacement and a tie bar connected at one end to the suspension arm by the compliance device and at the other end to the sprung part of the vehicle.

11. A suspension according to claim 10 in which the compliance device resiliently controls longitudinal displacement of greater amplitude than said limited longitudinal displacement.

12. A suspension according to claim 11 in which the compliance device includes bushes of a microcellular material such as micro-cellular polyurethane, arranged to limit said longitudinal displacement.

* * * * *